J. W. TIMM.
FRONT SPRING SUSPENSION FOR VEHICLES.
APPLICATION FILED JULY 13, 1918.
1,288,757.
Patented Dec. 24, 1918.
2 SHEETS—SHEET 1.
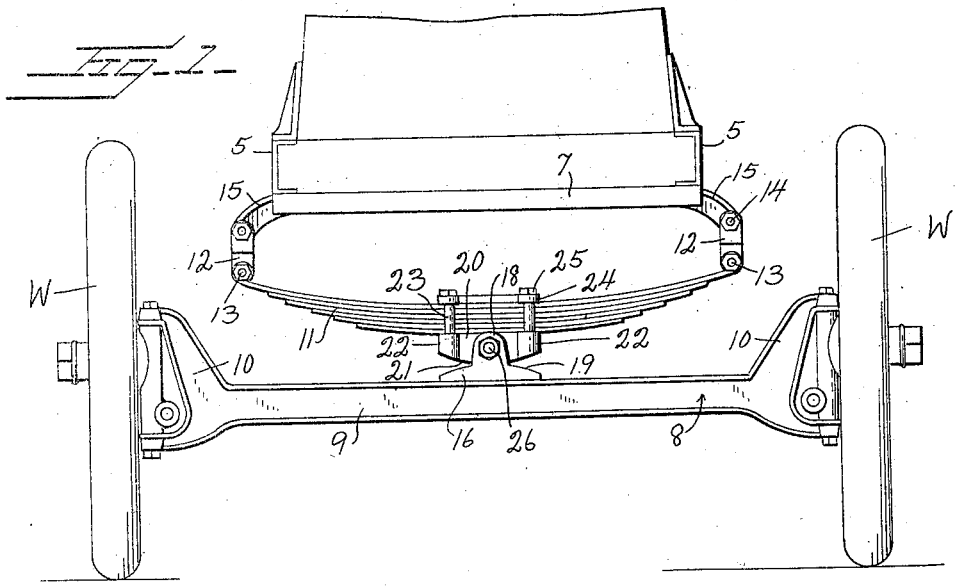
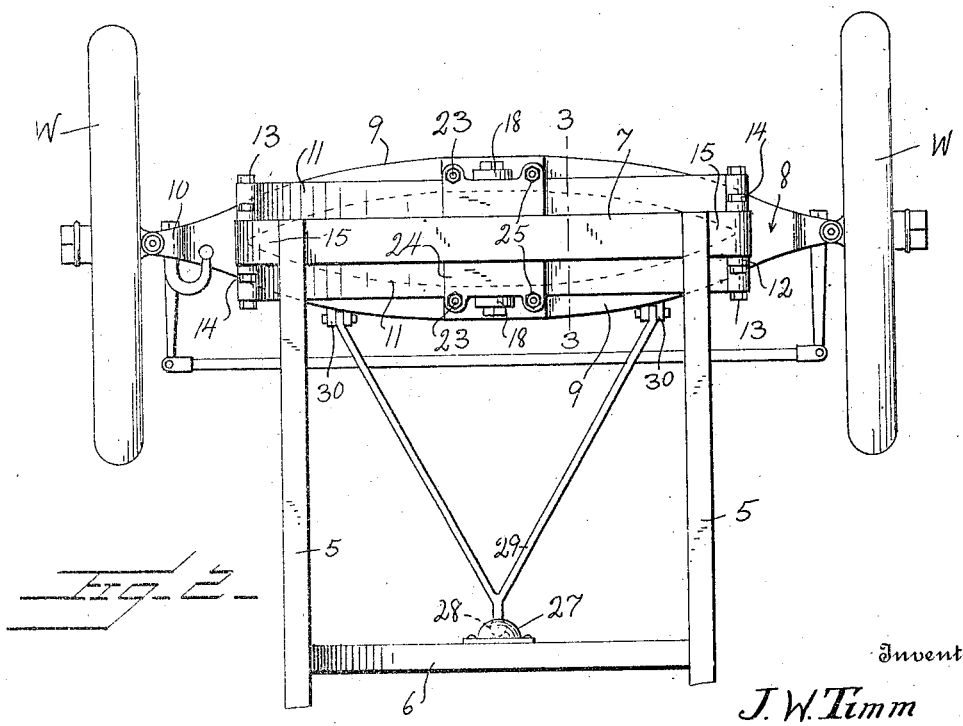
Inventor
J. W. Timm
By Watson E. Coleman
Attorney

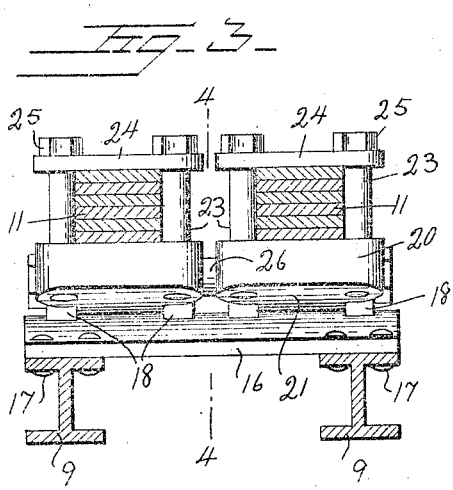
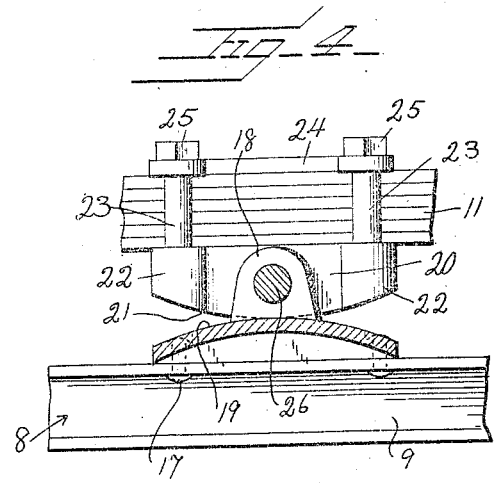
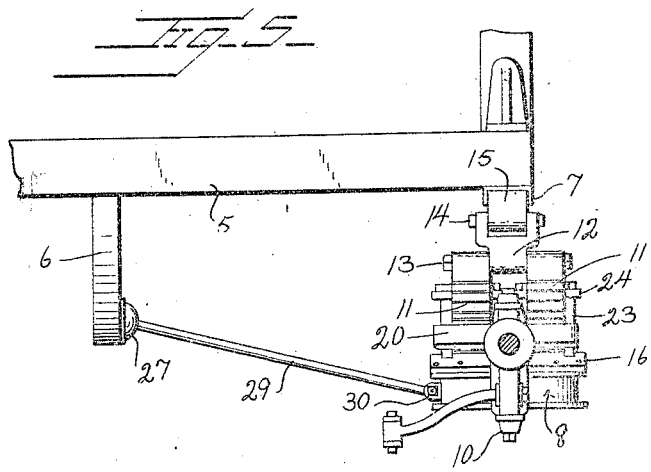

UNITED STATES PATENT OFFICE.

JOHN W. TIMM, OF MEMPHIS, TENNESSEE.

FRONT SPRING SUSPENSION FOR VEHICLES.

1,288,757.

Specification of Letters Patent. Patented Dec. 24, 1918.

Application filed July 13, 1918. Serial No. 244,746.

*To all whom it may concern:*

Be it known that I, JOHN W. TIMM, a citizen of the United States, residing at Memphis, in the county of Shelby and State of Tennessee, have invented certain new and useful Improvements in Front Spring Suspensions for Vehicles, of which the following is a specification, reference being had to the accompanying drawings.
This invention relates to an improved front spring suspension for vehicles, and has for its primary object to provide a simple and very durably constructed device, particularly designed for use in connection with motor vehicles, which will permit of a maximum freedom of angular movement of the front vehicle axle in traveling over rough roads so that all shocks or jars which would otherwise be transmitted to the body of the vehicle will be effectively absorbed by the suspension springs.

It is another and more particular object of the invention to provide in combination with a branched or divided front wheel axle, transversely extending leaf springs flexibly connected at their extremities to the opposite sides of the vehicle frame or chassis, and means for centrally mounting the springs upon the spaced portions of the axle for rocking movement, so that the body of the vehicle will at all times remain in a substantially horizontal plane irrespective of the degree of vertical angular movement of the wheel axle.
And it is a further general object of my invention to provide a front spring suspension for vehicles, the several parts of which are of simple construction and may be manufactured at relatively small cost, while the device as a whole will be reliable and serviceable for the purpose in view and capable of adaptation to the various types of motor vehicles without necessitating radical alterations in the construction thereof.
With the above and other objects in view, the invention consists in the improved construction, combination and relative arrangement of the several parts as will be hereinafter more fully described, subsequently claimed and illustrated in the accompanying drawings in which similar reference characters designate corresponding parts throughout the several views, and wherein:—

Figure 1 is a front end elevation illustrating one embodiment of my improved front spring suspension;

Fig. 2 is a top plan view;
Fig. 3 is a section taken on the line 3—3 of Fig. 2;
Fig. 4 is a section taken on the line 4—4 of Fig. 3; and
Fig. 5 is a side elevation, the wheel being removed.

Referring in detail to the drawings, 5 designates the spaced side rails or bars of the frame or chassis of a motor vehicle. These bars 5 are connected to each other in spaced relation to their forward ends by the transversely extending, downwardly bowed or curved bar 6. The extreme forward ends of the bars 5 are also connected to each other by a transversely disposed channel bar 7, which is suitably fixed to the under sides of the bars 5.

8 designates the front wheel axle, which is constructed with spaced, longitudinally extending branches or portions 9 disposed in the same horizontal plane, said branched portions of the axle gradually converging toward each other at their opposite ends and being integrally connected and formed to provide the vertically disposed wheel knuckle receiving yokes 10. The axle bar is preferably of the conventional I-beam type, as clearly seen in Fig. 3 of the drawings. The front vehicle wheels W may be mounted in the axle yokes 10 in any conventional manner and the usual steering connections are, of course, likewise provided between the wheel knuckles.

A pair of laminated leaf springs 11 are disposed transversely of the vehicle body between the same and the wheel axle, and to the terminals of the upper leaf of each spring shackle links 12 are connected by a common bolt 13 engaged through sleeves formed on the ends of the spring leaves. The shackle links are similarly connected by means of bolts 14 to outwardly and downwardly curved bracket members 15, which are securely riveted in the ends of the transverse channel bar 7.

Upon the branched portions 9 of the wheel axle, and at the center thereof, a casting 16 is seated at its ends and securely riveted or bolted to the respective branches of the axle, as seen at 17. This casting is formed with spaced pairs of upwardly projecting apertured ears 18 and between the ears in each pair, the upper face of the casting 16 is convexly curved, as at 19, transversely of the casting. These convex faces of the casting 16 provide rocker bearings for the spring seats 20, each of which is likewise provided with a convexly curved bottom face 21 in opposed contacting relation with the convex faces 19. These spring seats are disposed between the spaced pairs of ears 18 and at their opposite ends are formed upon their side faces with the laterally projecting lugs 22, each of which is provided with a vertically disposed threaded opening to receive the lower threaded end of a bolt 23. These bolts extend upwardly at the sides of the respective leaf springs 11 and are engaged through openings in the opposite ends of the clamping plates 24, which are forced into tight, clamping engagement upon the upper surface of the leaf springs by means of the nuts 25 threaded upon the bolts 23.

The rocker seats 20 for the leaf springs are each provided with a central, transverse opening to receive a common pivot bolt 26, which extends through the apertured ears 18 formed upon the casting 16. By mounting the leaf springs upon the divided or branched axle in this manner, it will be seen that the axle is capable of relatively great freedom of vertical angular movement occasioned by the vehicle wheels encountering obstructions or entering depressions in the road surface.

To the front side of the transverse frame bar 6, which constitutes a support for the rear end of the motor and at the center thereof, a socket casting 27 is securely riveted. This socket receives the spherical head 28 formed upon the integrally connected rear ends of the convergently disposed radius rods 29, the respective rods being pivotally connected at their forward ends, as shown at 30, to the rear side of the front wheel axle in spaced relation to the opposite ends thereof. These radius rods assist in holding the vehicle axle in proper relation to the frame of the machine and prevent twisting or turning movement of the axle in a horizontal plane.

From the foregoing description, taken in connection with the accompanying drawings, it is believed that the construction, manner of operation and several advantages of the invention will be clearly and fully understood. The transversely arranged pair of leaf springs connected to the front axle of the vehicle in the manner above explained, will effectively absorb all road shocks or jars and likewise operate to maintain the body of the vehicle in a horizontal plane in the vertical angular or tilting movements of the wheel axle. The several parts of the device are simple in construction and exceedingly strong and durable, so that they are not liable to break or easily get out of order. The divided or branched construction of the front wheel axle affords a maximum of strength with corresponding increased resistance to vertically or horizontally applied stresses. This axle may be constructed at nominal cost and substituted for the conventional type of front wheel axle. The several other elements may also be produced at relatively small cost and can be readily assembled and applied to various types of motor vehicles without requiring any radical changes in the construction thereof. While I have referred to the use of a pair of the leaf springs, it will be manifest that, if desired, a single one of said springs may be used upon light road vehicles and the conventional form of straight front axle employed in connection therewith. It is, accordingly, to be understood that while in the accompanying drawings I have illustrated one embodiment of my invention which I have found to be very satisfactory in practical use, the device is nevertheless susceptible of many modifications in the form, proportion and relative arrangement of its several parts and I, therefore, reserve the privilege of adopting all such legitimate changes as may be fairly embodied within the spirit and scope of the invention as claimed.

I claim:—

1. In combination with a vehicle body and supporting axle therefor, a transversely disposed leaf spring, flexible connections between the opposite ends of said spring and the vehicle body, a rocker seat centrally connected to the leaf spring, and a bearing fixed to the wheel axle and pivotally connected to said seat, said seat and bearing having opposed convex rocker faces.

2. In combination with a vehicle body and supporting axle therefor, a transversely disposed leaf spring, flexible connections between the opposite ends of said spring and the vehicle body, a rocker seat centrally connected to the leaf spring, a bearing casting centrally secured upon the axle and having spaced apertured ears between which said rocker seat is engaged, and a pivot bolt extending through said ears and the rocker seat, said seat and the bearing being provided with opposed convex rocker faces extending longitudinally of the axle.

3. In combination with a vehicle body and supporting axle therefor, said axle having spaced longitudinally extending portions, a pair of transversely disposed leaf springs, a common means flexibly connecting the springs at their ends to the vehicle body, a bearing centrally secured upon the spaced portions of the axle, and a rocker seat fixed to each spring and engaged upon said bearing.

4. In combination with a vehicle body and supporting axle therefor, said axle having spaced longitudinally extending portions, a pair of transversely disposed leaf springs, a common means flexibly connecting the springs at their ends to the vehicle body, a bearing centrally secured upon the spaced portions of the axle, said bearing being provided with spaced pairs of upstanding ears and convex rocker faces between said ears, spring seats pivotally mounted between the respective pairs of ears and each having a convex face opposed to one convex face of the bearing, and means for centrally securing the respective leaf springs upon said seats.

5. In combination with a vehicle body and supporting axle therefor, a leaf spring interposed between the vehicle body and the axle and connected at its ends to said body, and means pivotally connecting the axle to the intermediate portion of the spring to permit of the angular vertical movement of the axle relative to said spring.

6. In combination with a vehicle body and supporting axle therefor, a leaf spring interposed between the vehicle body and axle and connected at its ends to said body, and means fixed to said spring intermediate of its ends and mounted upon the axle for rocking movement.

7. In combination with a vehicle body and supporting axle therefor, a pair of leaf springs arranged in spaced parallel relation, means common to both springs for connecting the ends of the springs to the vehicle body, and a common pivotal connection between said springs intermediate of their ends and the vehicle axle 8. In combination with a vehicle body and supporting axle therefor, a pair of leaf springs arranged in spaced parallel relation, means common to both springs for connecting the ends of the springs to the vehicle body, a bearing fixed to the axle, and rocker members secured on the springs and engaged upon said bearing In testimony whereof I hereunto affix my signature in the presence of two witnesses.

JOHN W. TIMM.

Witnesses:
 MILTON THUNTILIS,
 HOMER W. POWELL.